Nov. 26, 1957 — E. G. PERRY — 2,814,549
RECTILINEAR RECORDING
Filed Dec. 31, 1953 — 2 Sheets-Sheet 1

INVENTOR
Edward Gordon Perry
BY Stevens, Davis, Miller and Mosher
ATTORNEYS

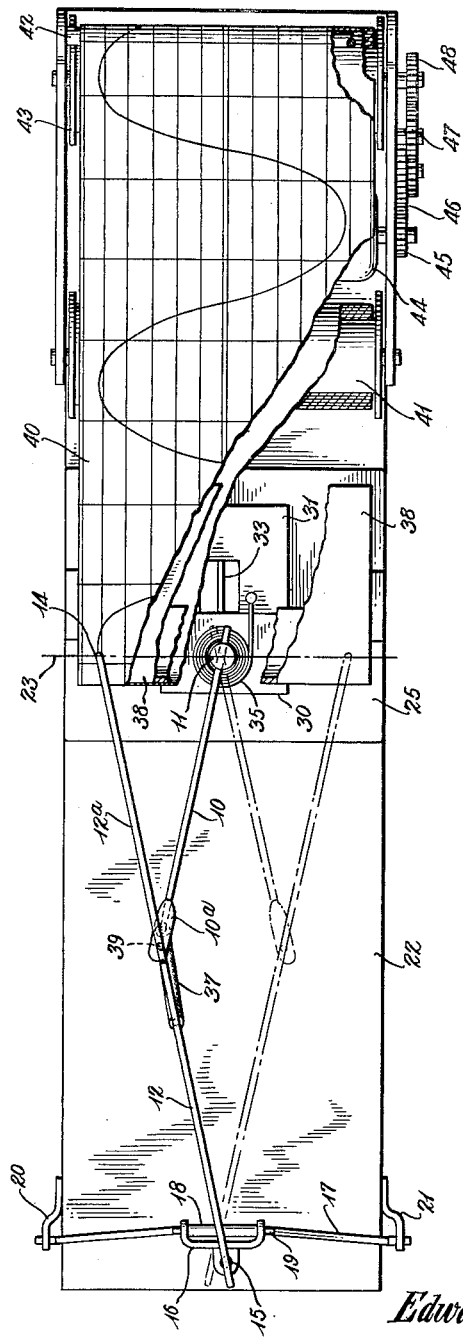

United States Patent Office 2,814,549
Patented Nov. 26, 1957

2,814,549

RECTILINEAR RECORDING

Edward Gordon Perry, Dallas, Tex., assignor to Texas Instruments Incorporated, Dallas, Tex., a corporation of Delaware Application December 31, 1953, Serial No. 401,659

9 Claims. (Cl. 346—139)

This invention relates to a mechanism for producing rectilinear recordings as distinguished from curved-line recordings and more particularly to a linkage for connecting the recording arm and pen point to the meter movement so that the pen point moves in a straight line as the meter movement deflects with applied signals.

There are several disadvantages to the use of a curved-line recording system. One such disadvantage is the difficulty of interpolating accurately because readings have to be transferred in an arc to a point of measurement instead of being read directly across in a straight line. Another disadvantage is that points of maximum value are difficult to determine. For example, two different wave forms may be impressed on a two pen recorder and it may be necessary to determine the phase shift angle between the waves. Due to the paper travel and the movement of the pen back and forth in an arc, there may be no well defined peak values from which the phase shift angle can be accurately determined.

Perhaps the most noticeable disadvantage of the curved coordinate recording in contrast to rectilinear recording occurs when the true shape of the curve and the area under the curve is required. Such an instance occurs in pneumotachograph recordings in which the area under the curve is a direct measure of the air exchanged in a person's lungs and the shape of the curve on expiration of air from the lungs produces characteristics which indicate the condition of the lungs. Recording on curved coordinates produces an erroneous measure of area under the curve as well as a distorted curve form.

It is an object of the present invention to provide a system for producing rectilinear recordings that will operate more efficiently and economically than recording systems heretofore available.

It is a further object of the present invention to provide a rectilinear recording system that will be characterized by a simple structure and a unique arrangement for feeding marking medium to the pen.

It is a still further object of the present invention to provide a means for connecting the recording arm and pen point to the meter movement that comprises a novel linkage.

Figure 1:
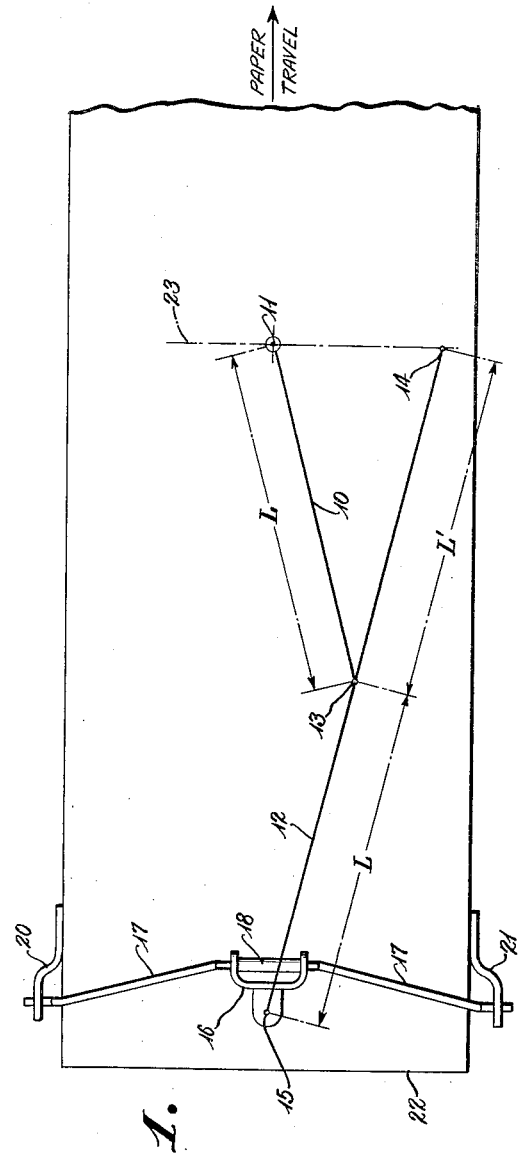
Figure 2:
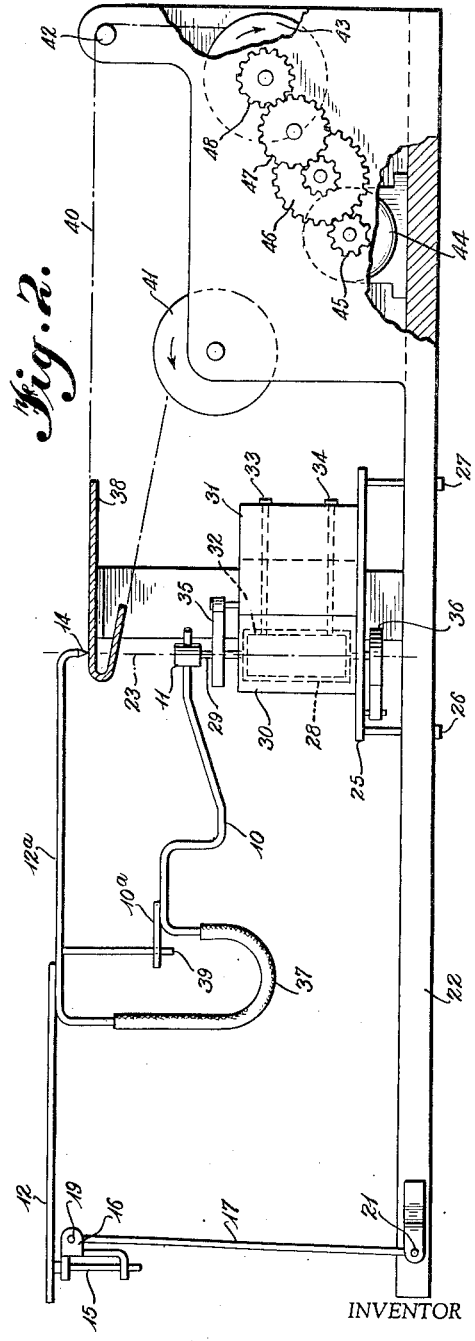

Other and further objects of the present invention will become apparent from a detailed consideration of the following description when taken in conjunction with the appended drawings in which:

Figure 1 presents diagrammatically a view in plan of a linkage for producing rectilinear recordings. Figure 2 shows a view in side elevation of the rectilinear recording linkage of the present invention arranged in conjunction with a recording mechanism. Figure 3 is a view in plan of the rectilinear recording linkage and recording mechanism shown in Figure 2.

Referring now to the drawings, Figure 1 illustrates diagrammatically a linkage for producing rectilinear recordings. As shown a link 10 is fixed at one end to a coupling 11 mounted on the output shaft of a meter movement and joined at the other end to the mid-point of a link 12. Although link 10 is fixed to coupling 11, link 10 actually pivots about the axis of rotation for the meter movement and, therefore, coupling 11 will hereinafter be referred to as the pivot point for link 10. A low friction connection is formed at the exact mid-point of link 12 for joining links 10 and 12 and consists of a pin 13 fixed at right angles to link 12 which extends downward through an eye in the end of link 10. By this arrangement, link 12 is halved into two equal sections each equal in length to link 10. The recording tip is shown as point 14 and rests on the recorder platen thereby forming the support for one end of link 12. The other end of link 12 is supported by a pin connection 15 extending through two flat aligning sections of mounting bracket 16.

Mounting bracket 16 is stamped from a flat sheet of metal, which upon fabrication takes the form of two C's arranged back-to-back but with the plane of one at 90° to the other. Thus the plane of one extends in a vertical direction while the plane of the other lies in a horizontal direction. Each C is drilled with two holes to provide a straight-through passage for either a pin or a shaft. Pin 15 is attached at right angles to the longitudinal axis of link 12 and extends downward through two holes in the C whose plane is in a vertical direction. Mounting bracket 16 is in turn supported by a wire bracket 17 made in the form of an inverted V with the sharp point of the V flattened. A sleeve 18 is fixed to the upper side of the flattened portion of bracket 17 and its length is such that it fits within the open portion of the C lying in a horizontal plane. A shaft 19 extends through the holes formed in the C section and through the sleeve 18 to make a hinged connection. The ends of bracket 17 are loosely fixed in clips 20 and 21 which are attached to the recorder frame 22. Thus, bracket 17 is free to move back and forth in an arc without binding pin 15 and consequently, link 12 is free to be moved by the meter movement through link 10.

As can be seen from Figure 1, there are several relations which must exist in order to produce rectilinear recordings. The first relation is that link 10 must be fixed at one end to a stationary pivot point 11 and its movement controlled by the pivot point. The second requisite is that link 10 must be connected to the mid-point of link 12 dividing it in effect into two links both equal in length to each other and link 10. Since each link is equal to the others, recording point 14 will be centered directly over the axis of rotation for the meter movement in the no-signal position. The third relation is that although connection 15 on link 12 is fixed in a straight line with the center of the meter movement and the long axis of the chart paper, it must be free to move back and forth along the straight line. Actually, it would be more accurate to state that the rectilinear recording linkage depends upon the pivot point 11 rather than the axis of rotation for the meter movement since the pivot point may be controlled, for example, by a push-pull meter movement linkage instead of directly from the output shaft of the meter movement.

These relations confine the movement of recording point 14 to a line through pivot point 11 and always at right angles to the line between pivot point 11 and connection 15. This can be proven by geometry since a circle with its center at point 13 and a radius of L will pass through points 11, 14 and 15 regardless of the angle of link 12 from a straight line between points 11 and 15. Link 12 will always be the diameter of the circle and a triangle inscribed in the circle between points 11, 14 and 15 will always be a right triangle. Because point 11 is stationary and point 29 is fixed to move in a straight line, the recording point 14 moves along line 23 which is perpendicular to the line between points 11 and 15.

Referring now to Figures 2 and 3 there is illustrated the application of a rectilinear recording linkage according to the present invention to a recorder. The meter movement for the recorder is mounted on a platform 25 supported above the recorder base 22 by screws 26 and 27 and includes a hollow rectangular coil 28 fixed to shaft 29 and supported between the north and south poles of a permanent magnet 30. Shaft 29 does not extend through coil 28 but is composed of two sections and is connected with the coil to leave the hollow central portion unobstructed and open. Magnetic material 31 adjoins the permanent magnet 30 and provides a low reluctance magnetic flux path joining the north and south poles of the magnet. Iron core 32 is supported inside coil 28 by screws 33 and 34 from the magnetic material 31 to provide a low reluctance path across the gap between the poles of the magnet but without interfering with the movement of coil 28. As signals are applied to coil 28 it deflects against the tension of springs 35 and 36 located at the upper and lower ends of shaft 29, respectively. These springs act to restore the coil to the no-signal position after the signal has been removed. Coupling 11 is mounted on shaft 29 and, as previously explained, fixes the end of link 10 against changing length and transmits the turning moment of the meter movement to the rectilinear recording linkage.

As described in connection with Figure 1, links 10 and 12 were considered to be single and complete links. Actually, link 10 is composed of two pieces, a hollow circular section 10 and a flat strip 10a which is rigidly attached to the hollow circular section. Also, link 12 is composed of two sections. The section designated by the number 12 is not necessarily hollow but section 12a, which is rigidly attached to section 12 is a hollow circular section and leads to the recording point 14. The two hollow sections of the linkage 10 and 12a, are joined together by a hollow flexible tube 37 to provide a path for the ink to recording point 14. Link 12 and 12a, considered as a single link, is supported at one end by platen 38 and at the same level at the other end by bracket 17, mounting bracket 16 and shaft 19. Pin 15 is attached to link 12 and extends downward through mounting bracket 16 to provide the point of rotation for the link. Pin 39 is attached at right angles and at the midpoint of link 12 and 12a and extends through the eye in section 10a. This pin provides the connection through which the deflection of the meter movement is transmitted to link 12 and 12a.

Chart paper 40 is supported by the paper supply roll 41. From the paper supply roll, it passes between platen 38 and the recording point 14 and then over guide roll 42 and wound onto paper take-up roll 43.

Motor 44 is attached to the recorder base 22 and mounts gear 45 on its output shaft. Gear 45 is part of the gear train 45 through 48, which upon rotation by motor 44, pulls the paper past recording point 14 at a pre-determined speed and winds the paper onto paper take-up roll 43.

The subject invention has been described in terms of providing rectilinear recording for a meter movement which records both positive and negative signals. However, by suitably arranging the meter movement coil in relation to the magnetic poles and adjusting the springs 35 and 36, rectilinear recording may be provided for uni-directional signals. In such a recorder, the zero axis could be at either edge of the chart and only increases in a particular variable such as flow would be recorded. Such an arrangement would be satisfactory in situations where there would be no reversals in the variable to be measured. Further, the recorder is not limited to an arrangement where the pivot point for the rectilinear recording linkage is underneath the recording point since the same relations and requisites for rectilinear recording could be maintained by mounting the meter movement, and thus the pivot point, above the recording point.

Although the present invention has been shown and described with reference to a preferred embodiment, nevertheless, changes and modifications which make themselves apparent to one skilled in the art are within the spirit, scope and contemplation of the inventive concept herein presented.

What is claimed is:

1. A device for producing rectilinear recordings comprising a base, a first link, a second link twice the length of said first link, one end of said first link pivotally connected to said second link midway between its ends, a meter movement defining a stationary pivot point, the other end of said first link mounted to pivot about said stationary pivot point, one end of said second link constituting a recording tip, and means holding the other end of said second link for movement directly toward and away from said stationary pivot point, said means including a bracket mounted for oscillatory movement in said base, and a pair of C shaped elements affixed together, and pivotally engaging said bracket and the other end of said second link.

2. A device for producing rectilinear recordings comprising a first link, a second link twice the length of said first link, one end of said first link pivotally connected to said second link midway between its ends, a meter movement defining a stationary pivot point, the other end of said first link mounted to pivot about said stationary pivot point, one end of said second link constituting a recording tip, and means holding the other end of said second link for movement directly toward and away from said stationary pivot point including a flat-topped bracket in the shape of an inverted V, a mechanism comprising a pair of elements affixed together and provided each with a hole therethrough, said holes located with axes thereof substantially normal with said flat-topped bracket rotatably disposed in one of said holes and said other end of said second link pivotally disposed in the other of said holes.

3. A device for producing rectilinear recordings comprising a base, a first link, a second link twice the length of said first link, one end of said first link pivotally connected to said second link midway between its ends, a meter movement defining a stationary pivot point, the other end of said first link mounted to pivot about said stationary pivot point, one end of said second link constituting a recording tip, and means holding the other end of said second link for movement directly toward and away from said stationary pivot point including a bracket in the shape of an inverted flat-topped V mounted in said base for oscillatory movement with respect thereto, a mechanism comprising a first element journaled for rotation on said flat-topped portion of said V, and a second element affixed to said first element to pivotally engage said other end of said second link.

4. A device for producing rectilinear recordings comprising a first link, a second link twice the length of said first link, one end of said first link pivotally connected to said second link midway between its ends, a meter movement defining a stationary pivot point, the other end of said first link mounted to pivot about said stationary pivot point, one end of said second link constituting a recording tip, and means holding the other end of said second link for movement directly toward and away from said stationary pivot point including a bracket in the shape of an inverted V with a plateau formed at its apex and the legs of the bracket mounted to enable the bracket to swing in an arc, a pair of elements joined together, one of said elements hingedly mounted on said plateau, a pin attached at right angles to the other end of said second link and said pin being received by the other of said elements and being freely rotatable with respect thereto.

5. A device as defined in claim 4 wherein said elements are C shaped and are joined back to back with the plane of one disposed 90° with respect to the plane of the other.

6. A device as defined in claim 1 wherein said second link is divided into two sections with the section including said recording tip being hollow whereby marking medium can be supplied to said recording tip.

7. A device as defined in claim 1 wherein said second link is divided into two sections with the section including said recording tip being hollow, said first link is hollow, and a flexible tube connects said first link and the hollow section of said second link whereby marking medium can be supplied to said recording tip by being introduced into said first link.

8. A device as defined in claim 4 wherein said second link is divided into two sections with the section including said recording tip being hollow whereby marking medium can be supplied to said recording tip.

9. A device as defined in claim 4 wherein said second link is divided into two sections with the section including said recording tip being hollow, said first link is hollow, and a flexible tube connects said first link and the hollow section of said second link whereby marking medium can be supplied to said recording tip by being introduced into said first link.

References Cited in the file of this patent

UNITED STATES PATENTS

| | | |
|---|---|---|
| 1,039,891 | Buchanan | Oct. 1, 1912 |
| 1,238,832 | Shelby et al. | Sept. 4, 1917 |
| 1,452,122 | McConnel | Apr. 17, 1923 |
| 2,442,586 | Clark | June 1, 1948 |
| 2,509,185 | Eckel | May 23, 1950 |

FOREIGN PATENTS

| | | |
|---|---|---|
| 488,553 | Germany | Dec. 30, 1929 |
| 633,527 | Germany | Aug. 4, 1936 |